（12）United States Patent
Yang et al.

(10) Patent No.: US 10,120,200 B2
(45) Date of Patent: Nov. 6, 2018

(54) DISPLAY APPARATUS

(71) Applicant: SAMSUNG ELECTRONICS CO., LTD., Suwon-si (KR)

(72) Inventors: Dae Kuen Yang, Suwon-si (KR); Keun-Bae Jeon, Suwon-si (KR); Sang Hyun Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/172,749

(22) Filed: Jun. 3, 2016

(65) Prior Publication Data
US 2017/0031170 A1 Feb. 2, 2017

(30) Foreign Application Priority Data

Jul. 29, 2015 (KR) .................. 10-2015-0107189

(51) Int. Cl.
G02B 27/26 (2006.01)
G02F 1/13357 (2006.01)
G02F 1/1335 (2006.01)
G02B 27/22 (2018.01)
F21V 8/00 (2006.01)
(Continued)

(52) U.S. Cl.
CPC ........... *G02B 27/26* (2013.01); *G02B 6/0051* (2013.01); *G02B 6/0056* (2013.01); *G02B 6/0076* (2013.01); *G02B 6/0088* (2013.01); *G02B 27/225* (2013.01); *G02B 27/2214* (2013.01); *G02F 1/1336* (2013.01); *G02F 1/133606* (2013.01); *H04N 13/312* (2018.05); *H04N 13/356* (2018.05); *G02F 1/133615* (2013.01); *G02F 2001/133626* (2013.01); *H04N 2213/001* (2013.01)

(58) Field of Classification Search
CPC .. G02F 1/1336; H04N 13/0411; G02B 6/0076
See application file for complete search history.

(56) References Cited

U.S. PATENT DOCUMENTS 9,476,567 B2 * 10/2016 Seuntiens ................. E04B 9/32
9,599,830 B2 * 3/2017 Wu ..................... G02B 27/2228
(Continued)

FOREIGN PATENT DOCUMENTS

JP 2012103663 A 5/2012

OTHER PUBLICATIONS

Communication dated Jul. 6, 2017 by the European Patent Office in counterpart European Application No. 16172543.7.
(Continued)

*Primary Examiner* — Sang V Nguyen
(74) *Attorney, Agent, or Firm* — Sughrue Mion, PLLC

(57) ABSTRACT

A display apparatus includes: a backlight assembly configured to emit light; and a display panel configured to display a two-dimensional (2D) image or a three-dimensional (3D) image using the light, wherein the backlight assembly includes: a first backlight unit configured to emit light for creating the 2D image; a second backlight unit configured to emit light for creating the 3D image; and a first polarizing panel disposed between the first backlight unit and the second backlight unit, and configured to prevent at least a portion of leakage light leaking from the second backlight unit from being incident to the second backlight unit.

13 Claims, 23 Drawing Sheets

(51) Int. Cl.
*H04N 13/312* (2018.01)
*H04N 13/356* (2018.01)

(56) References Cited

U.S. PATENT DOCUMENTS

| | | | | |
|---|---|---|---|---|
| 2006/0098140 A1* | 5/2006 | Lee | ................. | G02B 5/3058 |
| | | | | 349/98 |
| 2010/0253767 A1* | 10/2010 | Wang | ................. | H04N 13/0409 |
| | | | | 348/51 |
| 2010/0321341 A1* | 12/2010 | Cho | ................. | G06F 3/0412 |
| | | | | 345/175 |
| 2013/0027366 A1* | 1/2013 | Oki | ................. | H04N 13/0434 |
| | | | | 345/204 |
| 2013/0038829 A1* | 2/2013 | Hoshina | ............ | G02F 1/134363 |
| | | | | 349/140 |
| 2013/0076999 A1 | 3/2013 | Minami et al. | | |
| 2013/0201427 A1* | 8/2013 | Chen | ................. | G02B 27/2214 |
| | | | | 349/65 |
| 2014/0063853 A1* | 3/2014 | Nichol | ................. | G02B 6/0028 |
| | | | | 362/616 |
| 2014/0146271 A1* | 5/2014 | Hung | ................. | G02B 6/0011 |
| | | | | 349/62 |
| 2014/0160562 A1* | 6/2014 | Minami | ............... | G02B 6/0043 |
| | | | | 359/462 |
| 2015/0346499 A1* | 12/2015 | Minami | ................. | G02B 27/22 |
| | | | | 362/606 |
| 2016/0139327 A1* | 5/2016 | Choi | ................. | H04N 13/0411 |
| | | | | 362/613 |
| 2016/0216433 A1* | 7/2016 | Lee | ................. | G02B 6/0036 |

OTHER PUBLICATIONS

Communication dated Sep. 22, 2016, issued by the European Patent Office in counterpart European Application No. 16172543.7.
Communication dated Jun. 6, 2018, issued by the European Patent Office in counterpart European Application No. 16172543.7.

* cited by examiner

DISPLAY APPARATUS

CROSS-REFERENCE TO RELATED APPLICATION

This application claims priority from Korean Patent Application No. 10-2015-0107189, filed on Jul. 29, 2015 in the Korean Intellectual Property Office, the disclosure of which is incorporated herein by reference in its entirety.

BACKGROUND

1. Field

Apparatuses and methods consistent with exemplary embodiments relate to a display apparatus and a method for improving cross-talk.

2. Description of the Related Art

A display apparatus is used to display visual information. Examples of the display apparatus are a Liquid Crystal Display (LCD) device, an ElectroLuminescence Display (ELD) device, a Field Emission Display (FED) device, a Plasma Display Panel (PDP) device, a Thin Film Transistor-Liquid Crystal Display (TFT-LCD) device, and a flexible display device.

Such a display device is used as a television (TV), a monitor of a computer, or a monitor of a laptop computer. Also, the display device is used as display units of various electronic devices, such as a display unit of a mobile terminal, a display unit of a refrigerator, and a display unit of a camera.

Recently, a display device capable of displaying three-dimensional (3D) images as well as two-dimensional (2D) images has been developed.

A general method of implementing 3D images is to use a viewer's binocular disparity.

A method of implementing 3D images using binocular disparity can be classified into a stereoscopic method and an autostereoscopic method.

The stereoscopic method requires a user to wear 3D glasses, such as polarizing glasses and LC shutter glasses.

The autostereoscopic method enables a user to view 3D images with naked eyes by using a lenticular lens, parallax barriers, parallax illumination, etc.

The autostereoscopic method is applied to a display for games, a home TV, a display for exhibition, etc.

In the autostereoscopic method, a method using parallax barriers is to implement 3D images by causing light scattered by patterns arranged at regular intervals in a light guide plate (LGP) to be transmitted through a display panel.

SUMMARY

One or more exemplary embodiments provide a display apparatus including a polarizing panel for preventing leakage light of a second backlight unit from being incident to the second backlight unit when the second backlight unit is driven in order to display a 3D image.

According to an aspect of an exemplary embodiment, there is provided a display apparatus including: a backlight assembly configured to emit light; and a display panel configured to display a two-dimensional (2D) image or a three-dimensional (3D) image using the light, wherein the backlight assembly includes: a first backlight unit configured to emit light for creating the 2D image; a second backlight unit configured to emit light for creating the 3D image; and a first polarizing panel disposed between the first backlight unit and the second backlight unit, and configured to prevent at least a portion of leakage light leaking from the second backlight unit from being incident to the second backlight unit.

The first polarizing panel may be configured to emit only a portion of the leakage light that is incident to the first polarizing panel, and emit only a portion recycled light that is emitted from the first backlight unit and is incident to the first polarizing panel, the recycled light being emitted from the first backlight unit by recycling the portion of the leakage light that is emitted by the first polarizing panel and incident to the first backlight unit.

The display panel may include a liquid crystal panel, and a second polarizing panel disposed between the liquid crystal panel and the second backlight unit, and the first polarizing panel and the second polarizing panel have a same polarizing axis.

The first backlight unit may include a first light guide plate, and a first light source unit disposed along a lateral side of the first light guide plate.

The first backlight unit may include a first light source unit, and a diffusion plate disposed in front of the first light source unit, and configured to diffuse light emitted from the first light source unit.

The second backlight unit may include: a second light guide plate; a second light source unit disposed along a lateral side of the second light guide plate, and configured to emit light to the second light guide plate; and a plurality of barriers arranged at regular intervals in the second light guide plate, and configured to reflect and scatter incident light.

The second light guide plate may be configured to totally reflects light emitted from the second light source unit, and emit light scattered and reflected by the barriers to outside of the second light guide plate.

The second backlight unit and the first polarizing panel may be configured to transmit light emitted from the first backlight unit.

The backlight polarizing panel may be an absorptive polarizing panel.

The backlight polarizing panel may be a reflective polarizing panel.

According to an aspect of another exemplary embodiment, there is provided display apparatus including: a display panel configured to display a two-dimensional (2D) image or a three-dimensional (3D) image; a first backlight unit configured to emit light for creating the 2D image; a second backlight unit disposed between the display panel and the first backlight unit, and configured to emit light for creating the 3D image; and a first polarizing panel disposed between the first backlight unit and the second backlight unit, and configured to, when the second backlight unit is operating, pass only a portion leakage light that leaks from the second backlight unit and incident to the first polarizing panel, and pass only a portion of recycled light that is emitted from the first backlight unit and is incident to the first polarizing panel, the recycled light being emitted from the first backlight unit by recycling the portion of the leakage light that is emitted by the first polarizing panel and incident to the first backlight unit, and when the first backlight unit is operating, transmit light that is emitted from the first backlight unit and is incident to the first polarizing panel.

The display panel comprises a liquid crystal panel, a second polarizing panel disposed between the liquid crystal panel and the second backlight unit and having a same polarizing axis as the first polarizing panel, and a third polarizing panel disposed in front of the liquid crystal panel.

The second backlight unit may include: a light guide plate; a light source unit disposed along a lateral side of the light guide plate, and configured to emit light to the light guide plate; and a barriers disposed on a surface facing the first polarizing panel among a plurality of surfaces of the light guide plate, and configured to reflect and scatter light that is incident to the light guide plate.

According to an aspect of another exemplary embodiment, there is provided a display apparatus including: a display panel; a first backlight unit configured to emit light; a second backlight unit disposed between the display panel and the first backlight unit, and configured to emit light; a first polarizing panel disposed between the first backlight unit and the second backlight unit; and a barrier panel disposed between the second backlight unit and the first polarizing panel, and having a transmission area to transmit light and a reflective area to reflect light.

The first polarizing panel may be configured to: reduce an amount of leakage light that leaks from the second backlight unit and is incident to the first polarizing panel and emit the reduced amount of the leakage light to the first backlight unit, and reduce an amount of recycled light that is emitted from the first backlight unit and is incident to the first backlight unit, and emit the reduced amount of the recycled light to the second backlight unit, the recycled light being emitted from the first backlight unit by recycling the reduced amount of the leakage light that is emitted by the first polarizing panel and incident to the first backlight unit.

The barrier panel may contact the second backlight unit.

The first polarizing panel may contact the barrier panel.

The first backlight unit may contact the backlight polarizing panel.

The display apparatus may further include a controller configured to control driving of the first backlight unit in a two-dimensional (2D) image display mode, control driving of the second backlight unit in a three-dimensional (3D) image display mode, and control driving of the display panel based on image information.

The second backlight unit may include: a light guide plate; a light source unit disposed along a lateral side of the light guide plate, and configured to emit light to the light guide plate; barriers disposed on a surface facing the first polarizing panel among a plurality of surfaces of the light guide plate, and configured to reflect and scatter light that is incident to the light guide plate, and the display panel may include: a liquid crystal panel configured to create a left eye image and a right eye image using light reflected by the barriers in the 3D image display mode; a second polarizing panel disposed between the liquid crystal panel and the second backlight unit and having the same polarizing axis as the backlight polarizing panel; and a third polarizing panel disposed in front of the liquid crystal panel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the exemplary embodiments will be described in detail with reference to the accompanying drawings.

Figure 1:
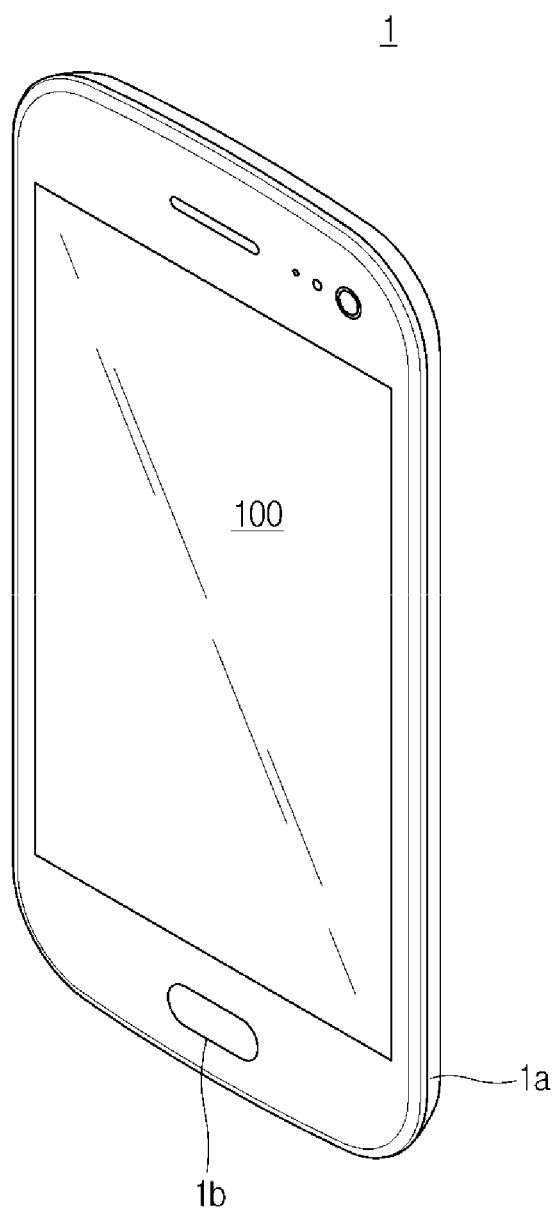
FIGS. 1 and 2 show a display apparatus according to an exemplary embodiment.
Figure 2:
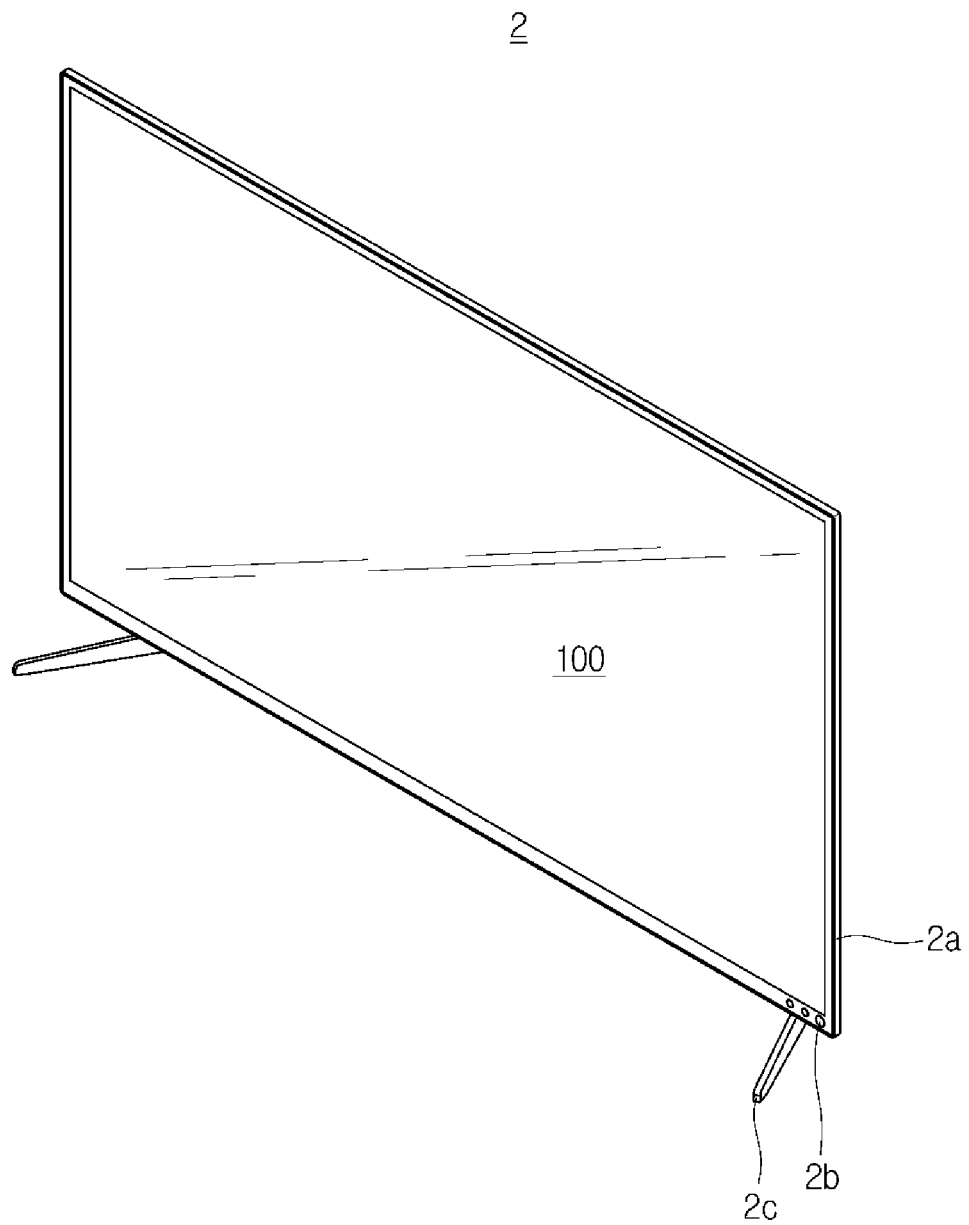

FIGS. 1 and 2 show examples of a display apparatus according to an exemplary embodiment.

As shown in FIG. 1, a display apparatus may be implemented as a display unit of a mobile device 1, such as a smart phone, a tablet, a Personal Computer (PC), and a laptop computer. Also, as shown in FIG. 2, the display apparatus may be implemented as a display unit of a television 2.

As shown in FIG. 1, the mobile device 1 may include a main body 1*a* forming an outer appearance.

The main body 1*a* may further include an input unit 1*b* to receive a user's command, and a display unit (that is, a display apparatus 100) to display various information.

The main body 1*a* may further include a bezel disposed along the borders of the display unit 100.

Accordingly, the display unit 100 may be protected from external shocks by the bezel.

In the main body 1a, a printed circuit board (PCB) may be installed to drive the display unit 100 according to input information input through the input unit 1b.

As shown in FIG. 2, the television 2 may include a main body 2a forming an outer appearance.

The main body 2a may further include an input unit 2b for receiving a user's command, and a display unit (that is, the display apparatus 100) for displaying various information.

The main body 2a may further include a bezel disposed along the borders of the display unit 100.

Accordingly, the display unit 100 may be protected from external shocks by the bezel.

In the main body 2a, a printed circuit board (PCB) may be installed to receive broadcasting information and drive the display unit 100 according to input information input through the input unit 1b.

The television 2 may further include a stand 2c disposed in the lower part of the main body 2a with the display unit 100 and configured to support the main body 2a.

Also, the television 2 may further include a bracket disposed in the rear surface of the main body 2a and configured to be fixed on a wall.

Also, the display apparatus 100 may be implemented as a monitor of a PC, or a guide display that is installed at bus stops, subway stations, department stores, etc.

Figure 3:
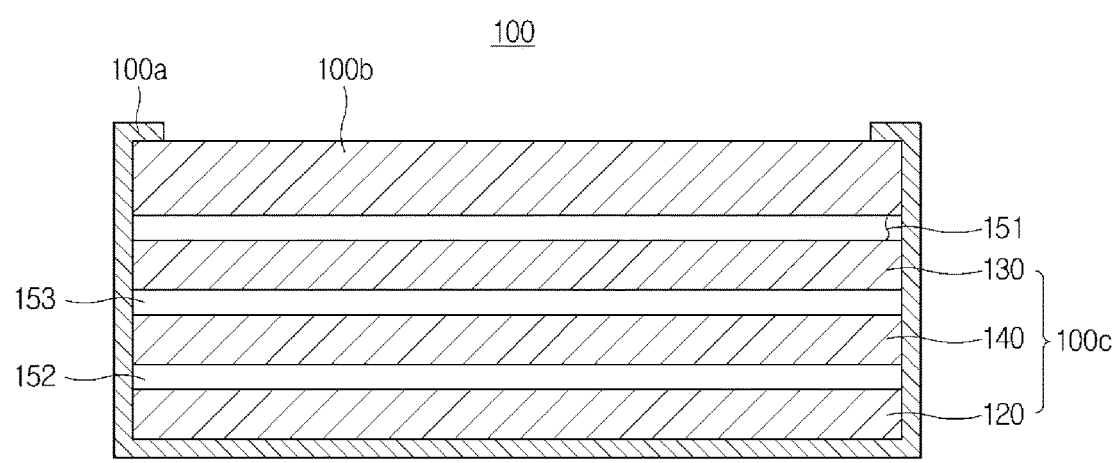
FIG. 3 is a configuration diagram of a display apparatus according to an exemplary embodiment.

FIG. 3 is a configuration diagram of the display apparatus 100 according to an exemplary embodiment.

Referring to FIG. 3, the display apparatus 100 may include a case 100a, a display panel 100b disposed in the case 100a and configured to display images, such as characters, figures, pictures, etc., and a backlight assembly 100c disposed in the case 100a behind the display panel 100b to be spaced a predetermined distance from the display panel 100b, and configured to emit light toward the display panel 100b.

The case 100a may protect the display panel 100b and the backlight assembly 100c.

Also, the display apparatus 100 may include, instead of the case 100a, a support frame disposed along the borders of the display panel 100b and the backlight assembly 100c.

The support frame may cause the display panel 100b to be maintained at a predetermined distance from the backlight assembly 100c.

The display panel 100b, which is a nonluminous display panel, may be any one of a Liquid Crystal Display (LCD) panel, an Organic ElectroLuminescence Display (ELD) panel, a Field Emission Display (FED) panel, and a Thin Film Transistor-Liquid Crystal Display (TFT-LCD) panel.

The display panel 100b may display 2D or 3D images using light emitted from the backlight assembly 100c.

The backlight assembly 100c may include a first backlight unit 120 to display 2D images, a second backlight unit 130 to display 3D images, and a polarizing panel 140 disposed between the first backlight unit 120 and the second backlight unit 130 and configured to reduce an amount of light leaking toward the first backlight unit 120 when the second backlight unit 130 operates.

The polarizing panel 140 may be an absorptive polarizing panel to absorb polarizing light orthogonal to the polarizing axis, or a reflective polarizing panel to reflect polarizing light orthogonal to the polarizing axis.

The absorptive polarizing panel may contain an iodine-based material.

The reflective polarizing panel may be configured by stacking a plurality of films, and include a panel to reflect light of a predetermined wavelength.

The display apparatus 100 may include a first gap 151 formed between the display panel 100b and the backlight assembly 100c.

The backlight assembly 100c may further include a second gap 152 formed between the first backlight unit 120 and the polarizing panel 140, and a third gap 153 formed between the second backlight unit 130 and the polarizing panel 140.

Figure 4:
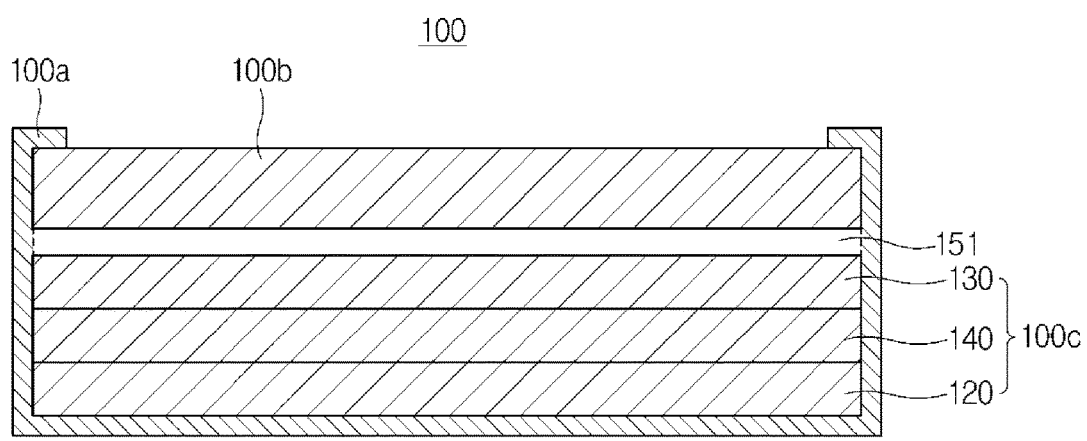
FIG. 4 is a configuration diagram of a display apparatus according to another exemplary embodiment.

FIG. 4 is a configuration diagram of the display apparatus 100 according to an exemplary embodiment, and shows a modified example of the display apparatus 100 of FIG. 3.

As shown in FIG. 4, the first backlight unit 120, the polarizing panel 140, and the second backlight unit 130 of the backlight assembly 100c may contact each other.

A configuration of the display apparatus 100 will be described in more detail with reference to FIGS. 5 to 12.

Figure 5:
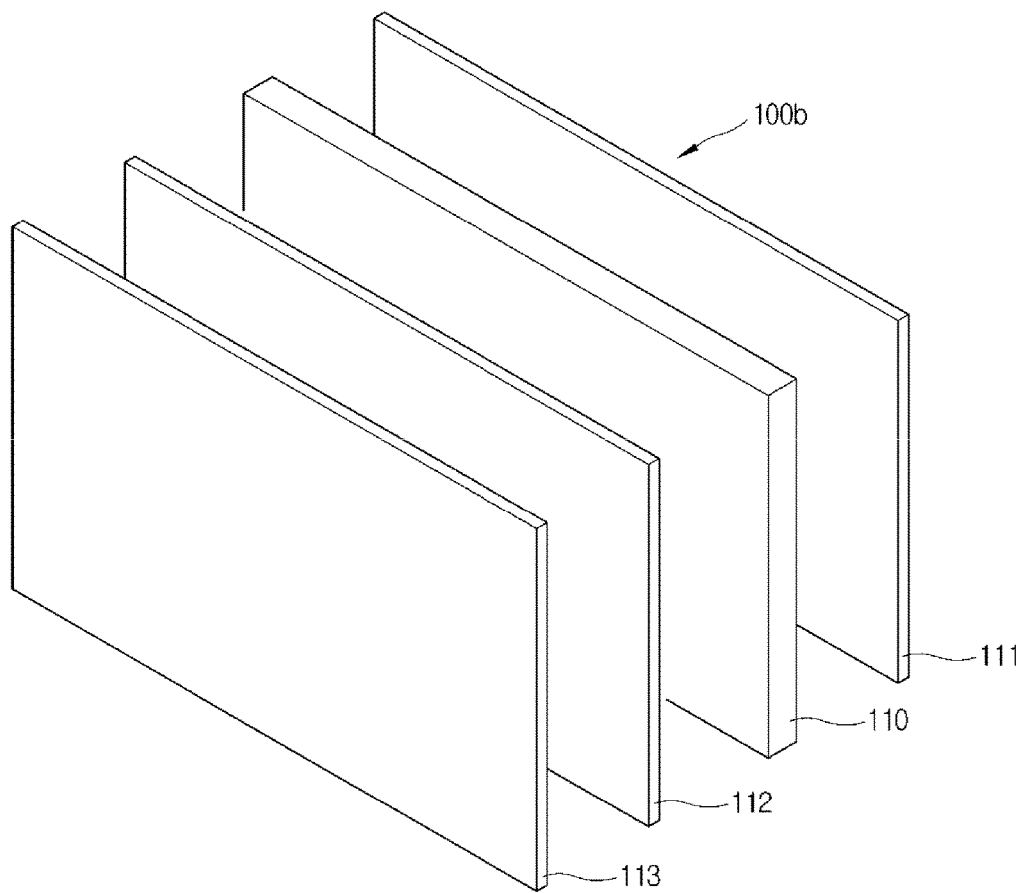
FIG. 5 is a configuration diagram of a display panel of a display apparatus according to an exemplary embodiment.

FIG. 5 is a detailed configuration diagram of the display panel 100b included in the display apparatus 100 according to an exemplary embodiment of the present disclosure.

The display panel 100b may be a LCD panel.

As shown in FIG. 5, the display panel 100b may include a liquid crystal panel 110, a first polarizing panel 111, a second polarizing panel 112, and a transparent protection panel 113.

The liquid crystal panel 110 may change electrical information into image information using a change of liquid crystal transmittance according to an applied voltage.

The first polarizing panel 111 may be disposed between the liquid crystal panel 110 and the backlight assembly 100c and configured to polarize non-polarized light transferred from the backlight assembly 100c in a first direction or in a second direction.

The a second polarizing panel 112 may be disposed in front of the liquid crystal panel 110 and configured to polarize image light output from the liquid crystal panel 110 in one direction.

Herein, the polarizing axis of the first polarizing panel 111 may be orthogonal to the polarizing axis of the second polarizing panel 112.

The polarizing direction of the first polarizing panel 111 may be identical to the polarizing direction of the polarizing panel 140 of the backlight assembly 100c.

Accordingly, the polarizing panel 140 of the backlight assembly 100c may prevent interference by light emitted from the first backlight unit 120, when the second backlight unit 130 is driven.

Light emitted from the first backlight unit 120 may be light that leaks from the second backlight unit 130 to the first backlight unit 120. This light may be recycled in the first backlight unit 120 and then emitted from the first backlight unit 120.

The liquid crystal panel 110 may include a liquid crystal cell having a pair of glass substrates with liquid crystal in between, and may further include a TFT array substrate disposed on one surface of the liquid crystal cell, and a color filter array substrate disposed on the other surface of the liquid crystal cell.

The TFT array substrate may include a plurality of gate lines, a plurality of data lines intersecting with the plurality of gate lines, a plurality of TFTs formed at intersections of the plurality of gate lines and the plurality of data lines, and a plurality of pixel electrodes formed in a matrix pattern by the data lines and the gate lines.

The TFT array substrate may transfer a voltage that is supplied through the data lines in response to pulses from the gate lines, to the pixel electrodes.

The color filter array substrate may include a plurality of unit pixels respectively corresponding to the plurality of pixel electrodes, and a black matrix formed in the borders of the plurality of unit pixels.

Each unit pixel may be one of a red pixel, a green pixel, and a blue pixel.

The display panel 100b may further include a transparent protection panel 113 disposed on the front surface of the second polarizing panel 112.

The transparent protection panel 113 may be a glass plate, or a polymer film or substrate made of polycarbonate, polyethylene terephthalate, polyacrylic, or the like.

The first backlight unit 120 may be disposed behind the display panel 100b, and emit light for displaying 2D images, toward the display panel 100b.

The first backlight unit 120 may be an edge type backlight unit or a direct type backlight unit.

A structure of the first backlight unit 120 will be described with reference to FIGS. 6 and 7, below.

Figure 6:
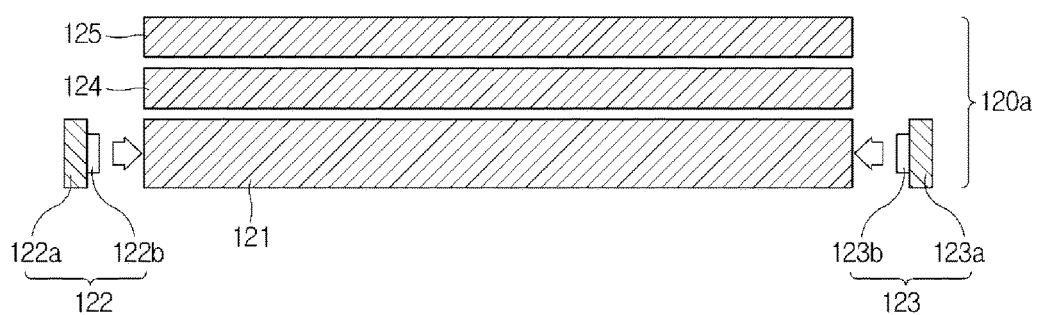
FIG. 6 is a configuration diagram of a first backlight unit of a display apparatus according to an exemplary embodiment.

FIG. 6 is a detailed configuration diagram of the first backlight unit 120 of the backlight assembly 100c included in the display apparatus 100 according to an exemplary embodiment, when the first backlight unit 120 is an edge type backlight unit.

An edge type first backlight unit 120a may be disposed behind the display panel 100b, wherein light source units are arranged at both lateral sides. The edge type first backlight unit 120a may include a first light guide plate 121, and a plurality of first light source units 122 and 123 arranged along both lateral sides of the first light guide plate 121.

The first light guide plate 121 may be used to guide incident light to the display panel 100b, and may be a flat type made of a polycarbonate (PC)-based material or a plastic material such as polymethylmethacrylate (PMMA) that is an acrylic transparent resin as one of transmitting materials capable of transmitting light.

The first light guide plate 121 may have excellent transparency, weathering, and colorability to induce diffusion of light when transmitting the light.

The first light source unit 122 may be opposite to the first light source unit 123 with the first light guide plate 121 interposed between.

The plurality of first light source units 122 and 123 may include a plurality of first substrates 122a and 123a on which wirings for transmitting and receiving driving power and operation signals are arranged, and a plurality of first Light Emitting Diodes (LEDs) 122b and 123b mounted on the first substrates 122a and 123a and configured to generate light with high efficiency and low power.

The edge type first backlight unit 120a may further include a reflective sheet disposed on the rear surface of the first light guide plate 121.

The reflective sheet may be disposed between the first light guide plate 121 and the case 100a (see FIG. 3), and reflect light emitted from the first light guide plate 121 toward the front surface of the first light guide plate 121.

The edge type first backlight unit 120a may further include one or more optical sheets.

In this exemplary embodiment, the edge type first backlight unit 120a may include two optical sheets, that is, a first optical sheet 124 and a second optical sheet 125.

The first optical sheet 124 may improve the optical property of light output from the first light guide plate 121 by uniformalizing the brightness of the light and diffusing the light or focusing the light with high brightness.

The second optical sheet 125 may transmit light selectively according to a wavelength of the light, and reflect light having a wavelength that is different from a selected wavelength toward the first backlight unit 120a, thereby increasing the transmission efficiency of light.

That is, the second optical sheet 125 may polarize light by transmitting only light of a predetermined wavelength therethrough.

The first optical sheet 124 may include a prism sheet in which prisms are formed, and the second optical sheet 125 may include a Dual Brightness Enhancement Film (DBEF) formed by multi-layer coating of dual refraction.

Figure 7:
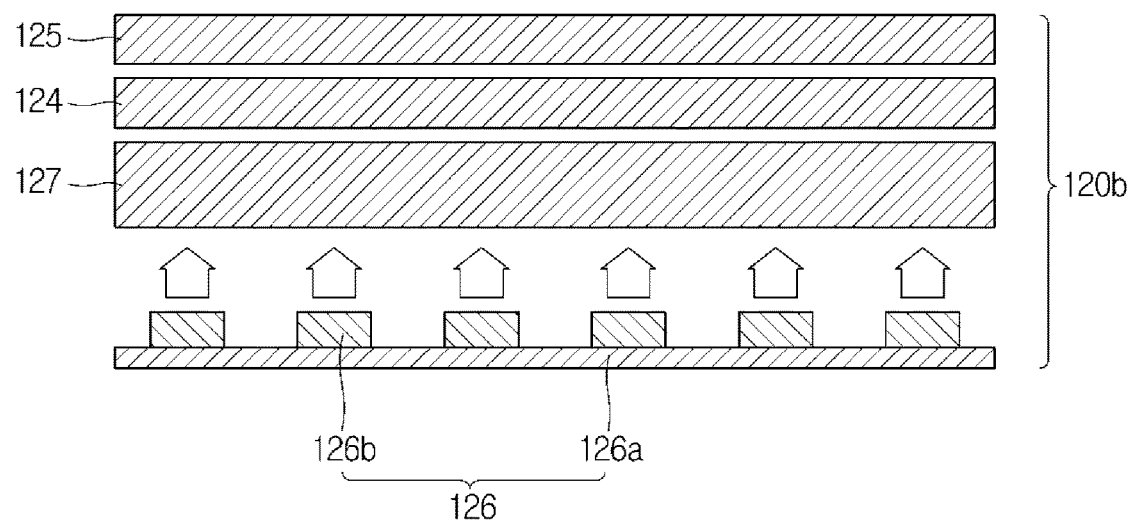
FIG. 7 is a configuration diagram of a first backlight unit of a display apparatus according to another exemplary embodiment.

FIG. 7 is a detailed configuration diagram of the first backlight unit 120 of the backlight assembly 100c included in the display apparatus 100 according to an exemplary embodiment, when the first backlight unit 120 is a direct type backlight unit.

As shown in FIG. 7, a direct type first backlight unit 120b may be disposed behind the display panel 100b, wherein a plurality of light sources are arranged at the rear part. The direct type first backlight unit 120b may include a first light source unit 126, and a diffusion plate 127 disposed between the first light source unit 126 and the display panel 100b.

The first light source unit 126 may include a first substrate 126a on which wirings for transmitting and receiving driving power and operation signals are arranged, and a plurality of first LEDs 126b mounted on the first substrate 126a and configured to generate light with high efficiency and low power.

The diffusion plate 127 may be a translucent panel disposed between the display panel 100b and the first light source unit 126, and configured to diffuse light emitted from the light source unit 126 along the surface, in order to show uniform colors and brightness throughout the entire screen aof the display panel 100b. The diffusion plate 127 may improve the brightness of light emitted from the light source unit 126.

The direct type first backlight unit 120b may further include one or more optical sheets 124 and 125.

The optical sheets 124 and 125 may be the same as the optical sheets 124 and 125 of the edge type first backlight unit 120a, and accordingly, a detailed description thereof will be omitted.

Figure 8:
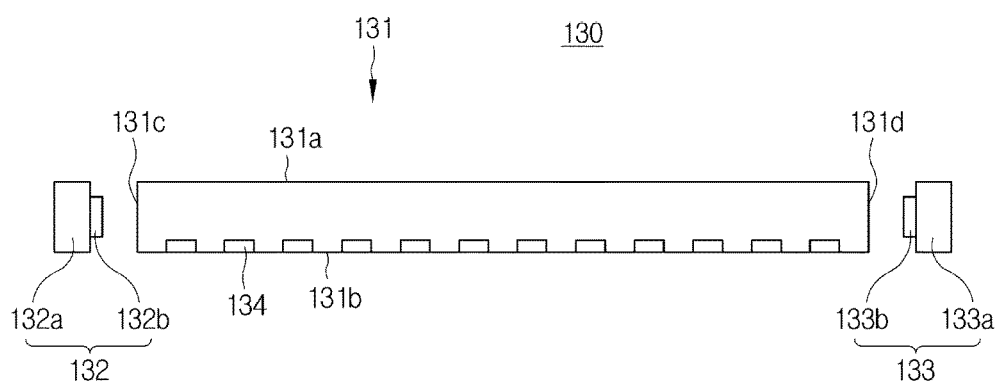
FIG. 8 is a cross-sectional view of a second backlight unit of a display apparatus according to an exemplary embodiment.
Figure 9:
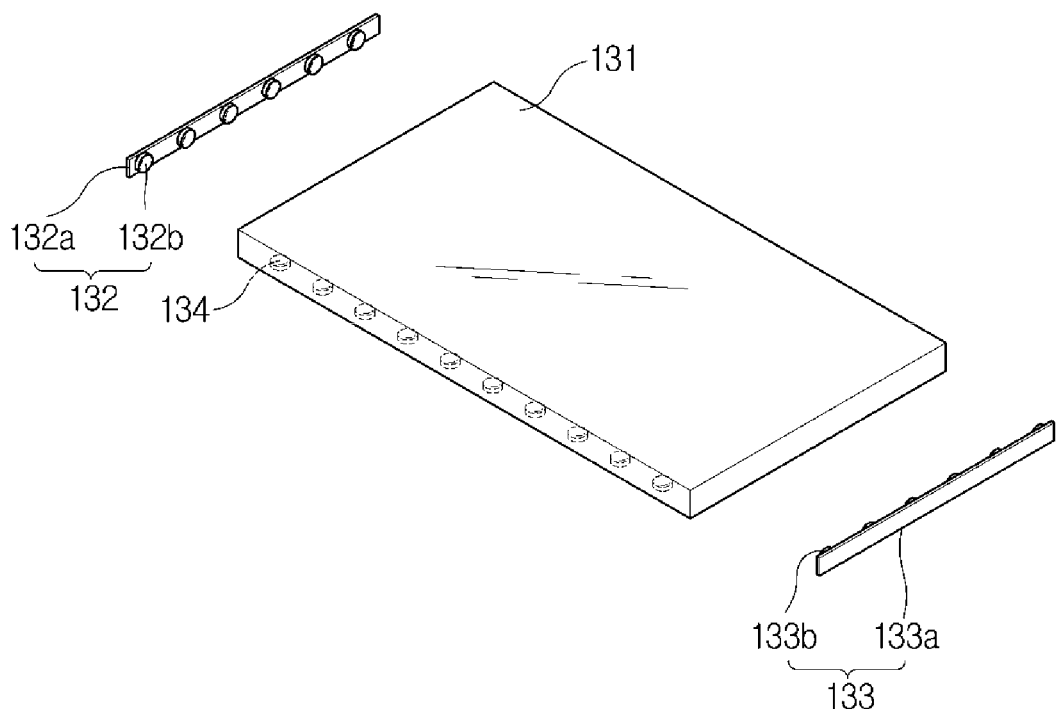
FIG. 9 is an perspective view of a second backlight unit according to an exemplary embodiment.
Figure 10:
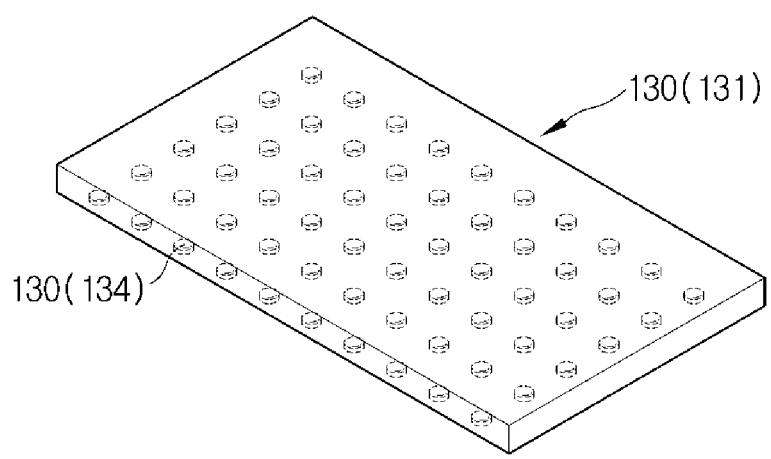
FIGS. 10 and 11 show barriers of a second backlight according to an exemplary embodiment.
Figure 11:
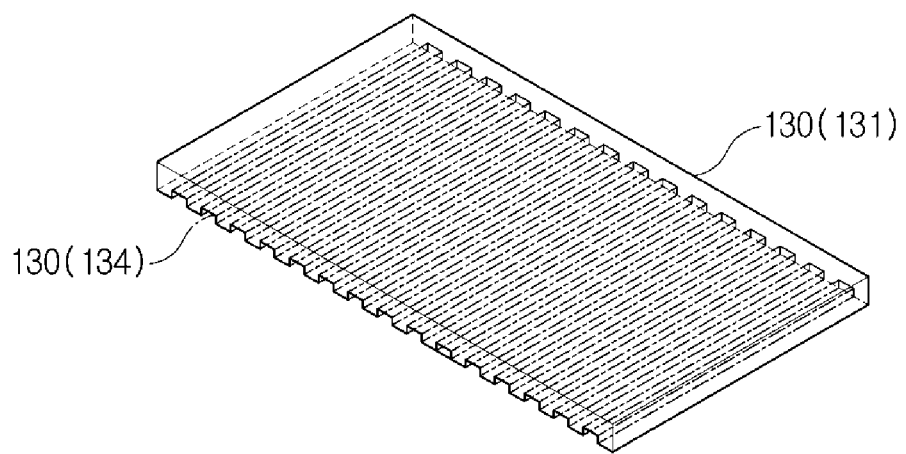

FIG. 8 is a cross-sectional view of the second backlight unit 130 of the backlight assembly 100c included in the display apparatus 100 according to an exemplary embodiment. FIG. 9 is an exploded perspective view of the second backlight unit 130 shown in FIG. 8. FIGS. 10 and 11 show examples of barriers of the second backlight unit 130 shown in FIG. 8.

As shown in FIGS. 8 and 9, the second backlight unit 130 may be disposed behind the display panel 100b, and emit light for displaying 3D images toward the display panel 100b.

The second backlight unit 130 may include a second light guide plate 131, a plurality of second light sources 132 and 133 respectively disposed along both lateral sides of the second light guide plate 131, and a plurality of barriers 134 formed in the second light guide plate 131.

The second light guide plate 131 may be made of a transparent plastic material such as acrylic resin, and the second light source units 132 and 133 may be a single unit.

The second light guide plate 131 may include a first internal reflective surface 131a positioned adjacent to the display panel 100b, a second internal reflective surface 131b positioned opposite to the first internal reflective surface 131a, and a plurality of incident surfaces 131c to which light emitted from the second light source units 132 and 133 are incident.

The first internal reflective surface 131a of the second light guide plate 131 may have been mirror-like finished throughout the entire surface. The first internal reflective surface 131a may totally reflect light incident at a predetermined angle or more to the inside of the second light guide plate 131 and emit light incident at an angle that is lower than the predetermined angle to the outside.

Herein, the light incident at the predetermined angle or more may be light having an incident angle satisfying a total reflection condition.

The second internal reflective surface 131b may have been mirror-like finished throughout the entire surface. The second internal reflective surface 131b may totally reflect light incident at a predetermined angle or more to the inside of the second light guide plate 131.

That is, the first internal reflective surface 131a and the second internal reflective surface 131b may totally reflect light incident at the predetermined angle or more to the inside of the second light guide plate 131.

Light incident at the predetermined angle or more from the first light source units 132 and 133 may be totally reflected by the first internal reflective surface 131a and the second internal reflective surface 131b to move toward the lateral surfaces of the second light guide plate 131.

Also, the first internal reflective surface 131a and the second internal reflective surface 131b of the second light guide plate 131 may transmit light emitted from the first backlight unit 120.

That is, if light emitted from the first backlight unit 120 is incident to the second internal reflective surface 131b of the second light guide plate 131, the second internal reflective surface 131b may transmit the incident light toward the first internal reflective surface 131a, and the first internal reflective surface 131a may emit the incident light to the outside.

The light incident to the second internal reflective surface 131b may be light having an incident angle that is lower than the predetermined angle with respect to the second internal reflective surface 131b.

The second light guide plate 131 may further include the plurality of barriers 134 formed on the second internal reflective surface 131b. The barriers 134 may be parallax barriers that are opaque.

The barriers 134 may include a pattern formed on the surface of the second light guide plate 131 by laser machining, sandblasting, or coating.

The barriers 134 may be depressed in the second internal reflective surface 131b of the second light guide plate 131.

The barriers 134 may be a plurality of depressions formed in the second light guide plate 131 and having a predetermined depth from the second internal reflective surface 131b. Also, the surfaces of the depressions may be machined to be opaque.

As shown in FIG. 10, the barriers 134 may be a pattern in which a plurality of dots are arranged at regular intervals.

Also, as shown in FIG. 11, the barriers 134 may be a pattern in which a plurality of straight lines are arranged at regular intervals.

The barriers 134 may scatter and reflect a part of light emitted from the first light source units 132 and 133, and reflect the remaining light toward the first internal reflective surface 131a so that light incident to the inside of the second light guide plate 121 is transmitted to the outside of the second light guide plate 131.

The light reflected to the outside of the second light guide plate 131 through the first internal reflective surface 131a may be light incident at an angle that is lower than the predetermined angle to the second light guide plate 131.

Light emitted from the second light source units 132 and 133 and incident at the predetermined angle or more to the second internal reflective surface 131b may be totally reflected in the inside of the second light guide plate 131 at an area in which no barriers 134 are formed in the second internal reflective surface 131b.

A part of the light totally reflected in the inside of the second light guide plate 131 at the area in which no barriers 134 are formed in the second internal reflective surface 131b may be emitted (that is, may leak) toward the first backlight unit 120.

A part of the light totally reflected in the inside of the second light guide plate 131 may be scattered and transmitted at the barriers 134, and the remaining light may be scattered and reflected at the barriers 134.

The entire or a part of the light scattered and reflected at the barriers 134 may be emitted toward the first internal reflective surface 131a and discharged to the outside, as light not satisfying the total reflection condition.

Also, the light scattered and transmitted at the barriers 134 may be light scattered and transmitted at the lateral surfaces of the barriers 134, and may be emitted toward the first backlight unit 120.

Figure 12:
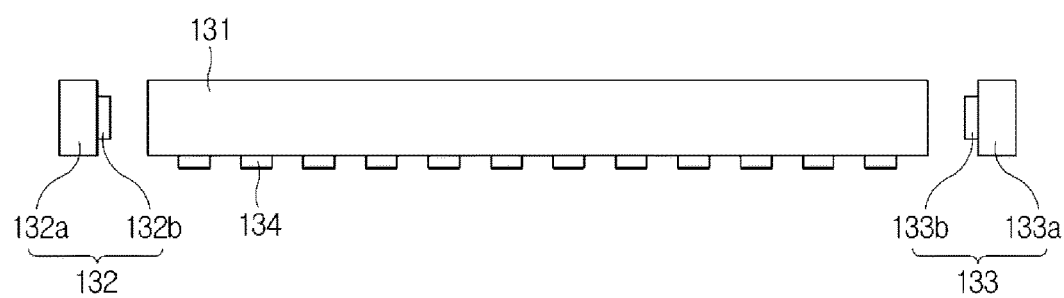
FIG. 12 is a configuration diagram of a second backlight unit of a display apparatus according to an exemplary embodiment.

FIG. 12 is a detailed configuration diagram of the second backlight unit 130 of the backlight assembly 100c included in the display apparatus 100 according to an exemplary embodiment, and shows a modified example of the second backlight unit 130 shown in FIG. 8.

Referring to FIG. 12, the second backlight unit 130 may include a plurality of barriers 134 protruding from the surface of the second light guide plate 131 to the outside.

The barriers 134 may include a plurality of light reflective members arranged at regular intervals on the surface of the second light guide plate 131.

The light reflective members may be made of an opaque material, and formed by patterning the surface of the second light guide plate 131 adjacent to the first backlight unit 120 using screen-printing.

A part of the light totally reflected in the inside of the second light guide plate 131 may be scattered and transmitted at the barriers 134, and the remaining light may be scattered and reflected at the barriers 134.

The entire or a part of the light scattered and reflected at the barriers 134 may be emitted toward the first internal reflective surface 131a and discharged to the outside, as light not satisfying the total reflection condition.

The light scattered and transmitted at the barriers 134 may be light scattered and transmitted at the lateral surfaces of the barriers 134, and may be emitted toward the first backlight unit 120.

Figure 13:
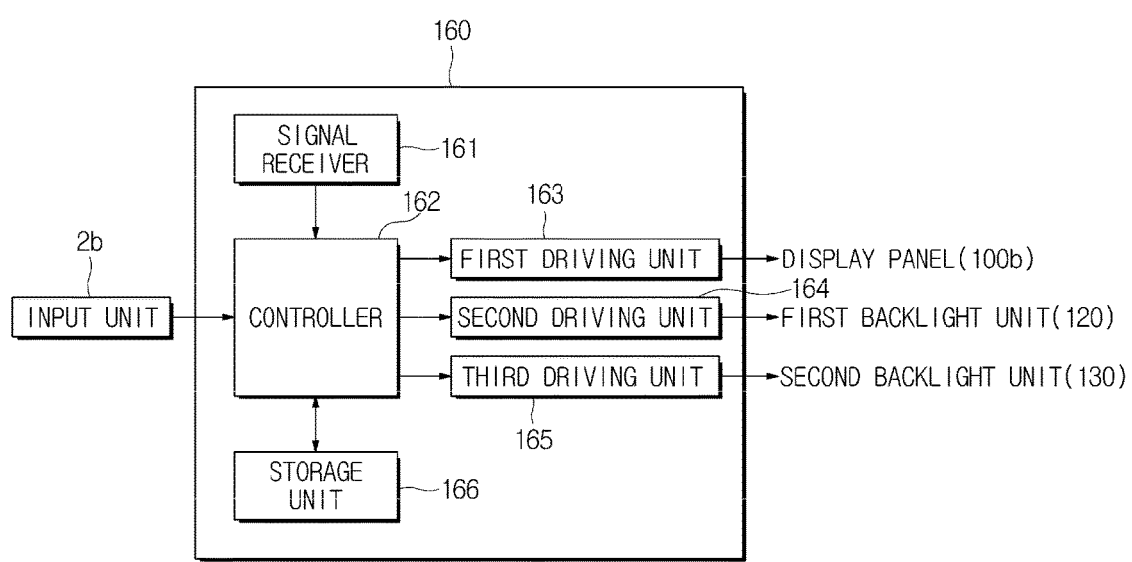
FIG. 13 is a control block diagram illustrating a display apparatus according to an exemplary embodiment.

FIG. 13 is a control configuration diagram of the display apparatus 100 according to an exemplary embodiment. Referring to FIG. 13, the display apparatus 100 may include an input unit 2b and a driving module 160.

The display apparatus 100 may be, for example, a television.

The driving module 160 may include a signal receiver 161, a controller 162, a first driving unit 163, a second driving unit 164, a third driving unit 165, and a storage unit 166.

The input unit 2b may receive various types of user inputs. For example, the input unit 2b may receive an input for entering a 2D image display mode or a 3D image display mode. Also, the input unit 2b may receive an input for setting a volume of sound or an input for setting a broadcasting channel.

The driving module 160 may drive the display panel 100b and the backlight assembly 100c, according to a display mode.

The signal receiver 161 may receive image information, and transfer the received image information to the controller 162.

The image information may be image information included in broadcasting signals, image information stored in the storage unit 166, and/or image information stored in a storage medium.

The controller 162 may determine the display mode of the display apparatus 100, and if the controller 162 determines that the display mode is a 2D image display mode, the controller 162 may transmit a command for driving the display panel 100b (see FIG. 4) to the first driving unit 163, and a command for driving the first backlight unit 120 (see FIG. 4) to the second driving unit 164.

If the controller 162 determines that the display mode is a 3D image display mode, the controller 162 may transmit a command for driving the display panel 100b (see FIG. 4) to the first driving unit 163, and a command for driving the second backlight unit 130 (see FIG. 4) to the third driving unit 165.

The controller 162 may perform signal processing on the received image information to display a 2D image or a 3D image based on the display mode.

The controller 162 may be a Central Processing Unit (CPU), a Micro Controller Unit (MCU), or a processor.

The first driving unit 163 may drive the display panel 100b based on a command from the controller 162 to create an image corresponding to the image information.

The display panel 100b may modulate incident light for each pixel according to image data to thereby display a 2D image.

The display panel 100b may display a plurality of viewpoint images corresponding to a plurality of viewing angle directions in the 3D image display mode.

For example, when the display panel 100b displays a binocular 3D image, the display panel 100b may display a left eye image and a right eye image, and when the display panel 100b displays a 3D image, the display panel 100b may display an image of a first channel, an image of a second channel, and an image of a third channel to compose the images of the three channels, thereby displaying a composite image.

The second driving unit 164 may operate the first light source units 122 and 123 of the first backlight unit 120 based on a command from the controller 162.

The third driving unit 165 may operate the second light source units 132 and 133 of the second backlight unit 130 based on a command from the controller 162.

The storage unit 166 may store image information.

The storage unit 166 may include at least one storage medium among a flash memory type, a hard disk type, a multimedia card micro type, card type memory (for example, Secure Digital (SD) or eXtreme Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

Hereinafter, a light path in the display apparatus 100 will be described with reference to FIGS. 14 to 19.

Figure 14:
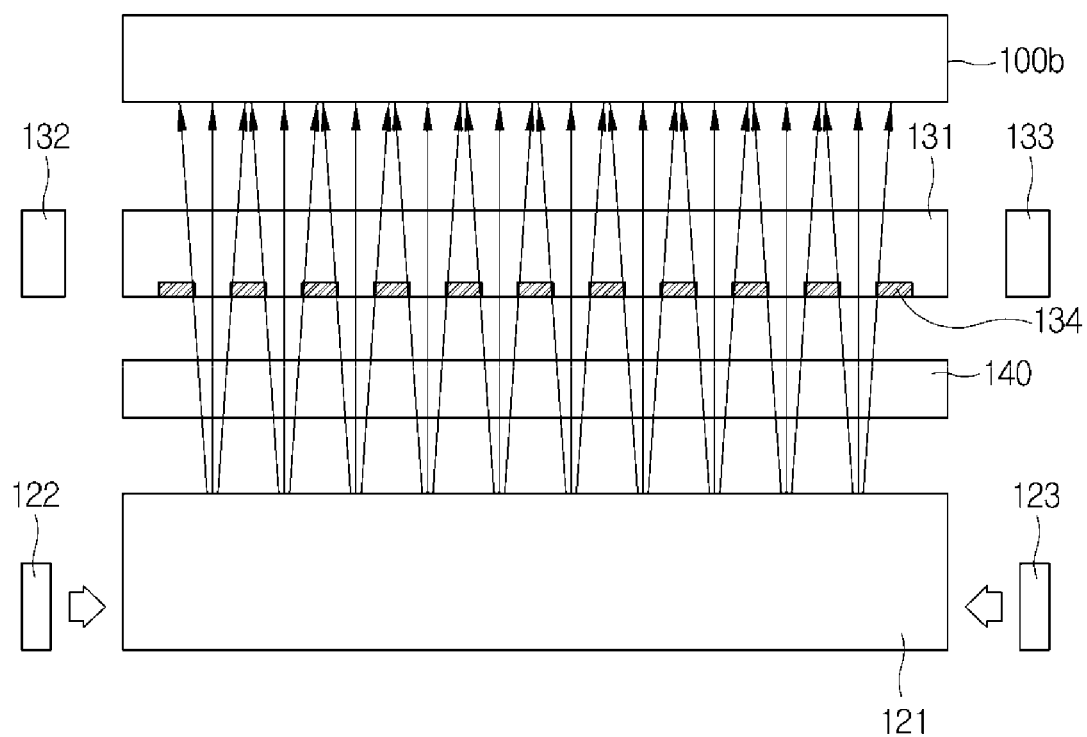
FIG. 14 shows a light path when a display apparatus having an edge type backlight unit as a first backlight unit operates in a 2D image display mode, according to an exemplary embodiment.

FIG. 14 shows a light path of the display apparatus 100 having the first backlight unit 120 that is an edge type backlight unit, when the display apparatus 100 operates in the 2D image display mode.

The display apparatus 100 may operate the plurality of first light source units 122 and 123 installed in the first backlight unit 120 to emit light.

The light emitted from the plurality of first light source units 122 and 123 may be incident to the first light guide plate 121, and the light incident to the first light guide plate 121 may be emitted to the outside.

The light emitted from the first light guide plate 121 of the first backlight unit 120 may be transmitted through the polarizing panel 140, and at this time, only light emitted in the same direction as the polarizing axis of the polarizing panel 140 may be transmitted through the polarizing panel 140.

The light transmitted through the polarizing panel 140 may be incident to the second light guide plate 131 of the second backlight unit 130.

The barriers 134 formed in the second light guide plate 131 of the second backlight unit 130 may prevent the light from being incident to the inside of the second light guide plate 131.

That is, light emitted from the first backlight unit 120 cannot pass through areas at which the barriers 134 are formed in the second light guide plate 131, as shown in FIG. 4.

Light incident to the second light guide plate 131 of the second backlight unit 130 does not satisfy the total reflection condition, so the light may be emitted to the outside of the second light guide plate 131.

The light exiting the second light guide plate 131 of the second backlight unit 130 may be incident to the display panel 100b.

At this time, only light proceeding in the same direction as the polarizing axis of the first polarizing panel 111 (see FIG. 5) may be incident to the display panel 100b.

The polarizing axis of the first polarizing panel 111 of the display panel 100b and the polarizing axis of the polarizing panel 140 of the backlight assembly 100c may have the same axial direction.

Accordingly, when a 2D image is displayed, the polarizing panel 140 of the backlight assembly 100c may prevent loss of light that is incident to the display panel 100b.

Then, the display panel 100b may display a 2D image using the incident light.

Figure 15:
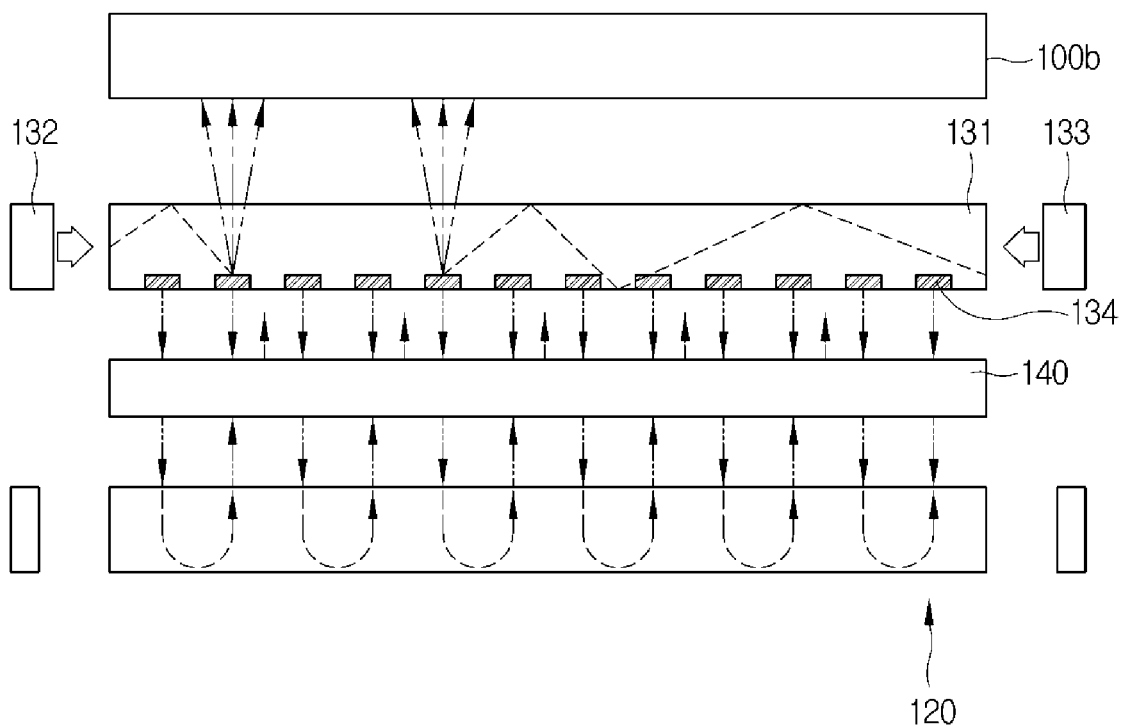
FIG. 15 shows a light path when a display apparatus having an edge type backlight unit as a first backlight unit operates in a 3D image display mode, according to an exemplary embodiment.

FIG. 15 shows a light path of the display apparatus 100 having the first backlight unit 120 that is an edge type backlight unit, when the display apparatus 100 operates in the 3D image display mode.

The display apparatus 100 may operate the plurality of second light source units 132 and 133 installed in the second backlight unit 130 to emit light.

The light emitted from the plurality of second light source units 132 and 133 may be incident to the second light guide plate 131.

A part of the light incident to the second light guide plate 131 may be totally reflected in the inside of the second light guide plate 131, and a part of the light may be reflected by the barriers 134. The light reflected by the barriers 134 may be emitted to the outside.

Light emitted from the second light guide plate 131 of the second backlight unit 130 may be incident to the display panel 100b.

Then, the display panel 100b may display a 3D image using the incident light.

When the second backlight unit 130 is driven, a part of light totally reflected in the second light guide plate 131 of the second backlight unit 130 may leak toward the first backlight unit 120.

In this case, the light (that is, leakage light) leaking from the second light guide plate 131 may be incident on the polarizing panel 140.

The polarizing panel 140 may emit only light proceeding in a direction corresponding to its polarizing axis among the incident leakage light, toward the first backlight unit 120.

The leakage light incident to the first backlight unit 120 may be recycled in the inside of the first backlight unit 120 and then emitted to the outside.

The recycled light emitted from the first backlight unit 120 may be incident to the polarizing panel 140.

The polarizing panel 140 may emit only light proceeding in a direction corresponding to its polarizing axis among the incident recycled light, toward the second backlight unit 130.

Accordingly, the light emitted from the polarizing panel 140 may be incident to the second backlight unit 130.

That is, when the second backlight unit 130 is driven, light leaking from the second backlight unit 130 may be primarily reduced by about 50% when passing through the polarizing panel 140, and light recycled in the first backlight unit 120 may be secondarily reduced by 50% additionally when again passing through the polarizing panel 140.

In this way, leakage light leaking from the second backlight unit 130 and then again incident to the second backlight unit 130 may be minimized, thereby reducing light interfering with creating a 3D image when the 3D image is displayed.

Figure 16:
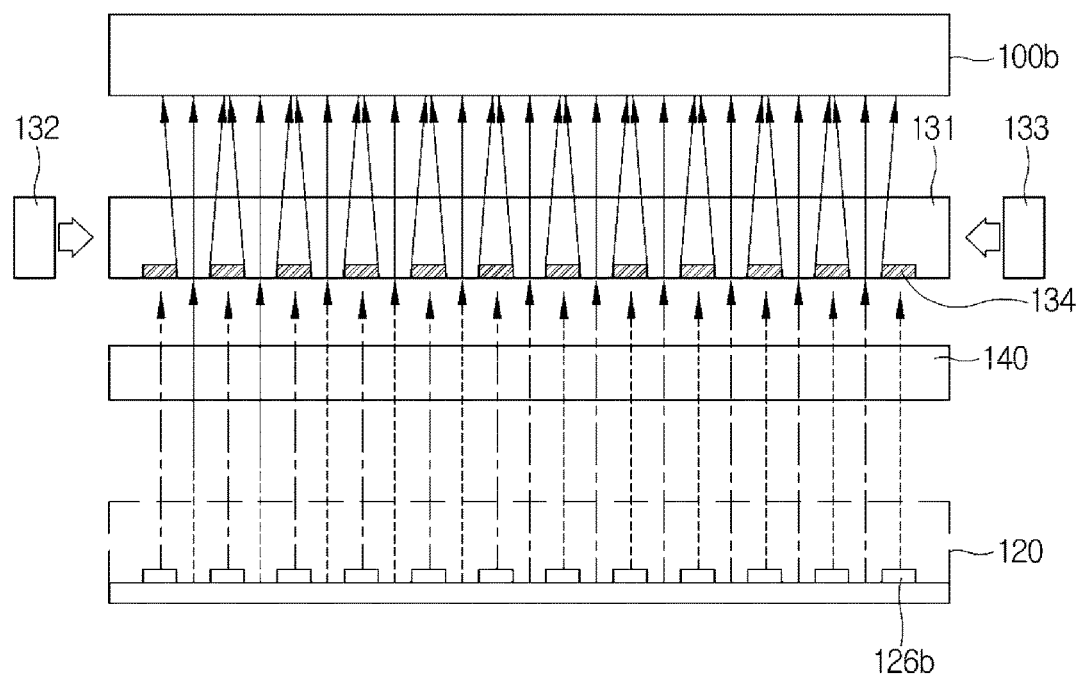
FIG. 16 shows a light path when a display apparatus having a direct type backlight unit as a first backlight unit operates in a 2D image display mode, according to an exemplary embodiment.

FIG. 16 shows a light path of the display apparatus 100 having the first backlight unit 120 that is a direct type backlight unit, when the display apparatus 100 operates in the 2D image display mode.

The display apparatus 100 may operate the first LEDs 126*b* of the first light source unit 126 installed in the first backlight unit 120 to emit light.

At this time, light emitted from the first light source unit 126 may be diffused by the diffusion plate 127 (see FIG. 7), and the light diffused by the diffusion plate 127 may be emitted to the outside.

The light emitted from the first backlight unit 120 may be transmitted through the polarizing panel 140, and at this time, only light proceeding in the same direction as the polarizing axis of the polarizing panel 140 may be transmitted through the polarizing panel 140.

The light transmitted through the polarizing panel 140 may be incident to the second light guide plate 131 of the second backlight unit 130.

The barriers 134 formed in the second light guide plate 131 of the second backlight unit 130 may prevent the light from being incident to the inside of the second light guide plate 131.

That is, at areas in which the barriers 134 are formed in the second light guide plate 131, light emitted from the first backlight unit 120 may not be incident to the inside of the second light guide plate 131.

Light incident to the second light guide plate 131 of the second backlight unit 130 may be light that does not satisfy the total reflection condition, and may be emitted to the outside of the second light guide plate 131.

Light emitted from the second light guide plate 131 of the second backlight unit 130 may be incident to the display panel 100*b*.

At this time, only light proceeding in the same direction as the polarizing axis of the first polarizing panel 111 may be incident to the display panel 100*b*.

The polarizing axis of the first polarizing panel 111 of the display panel 100*b* and the polarizing axis of the polarizing panel 140 of the backlight assembly 100*c* may have the same axial direction.

Accordingly, when a 2D image is displayed, the polarizing panel 140 of the backlight assembly 100*c* may prevent loss of light that is incident to the display panel 100*b*.

Then, the display panel 100*b* may display a 2D image using the incident light.

Figure 17:
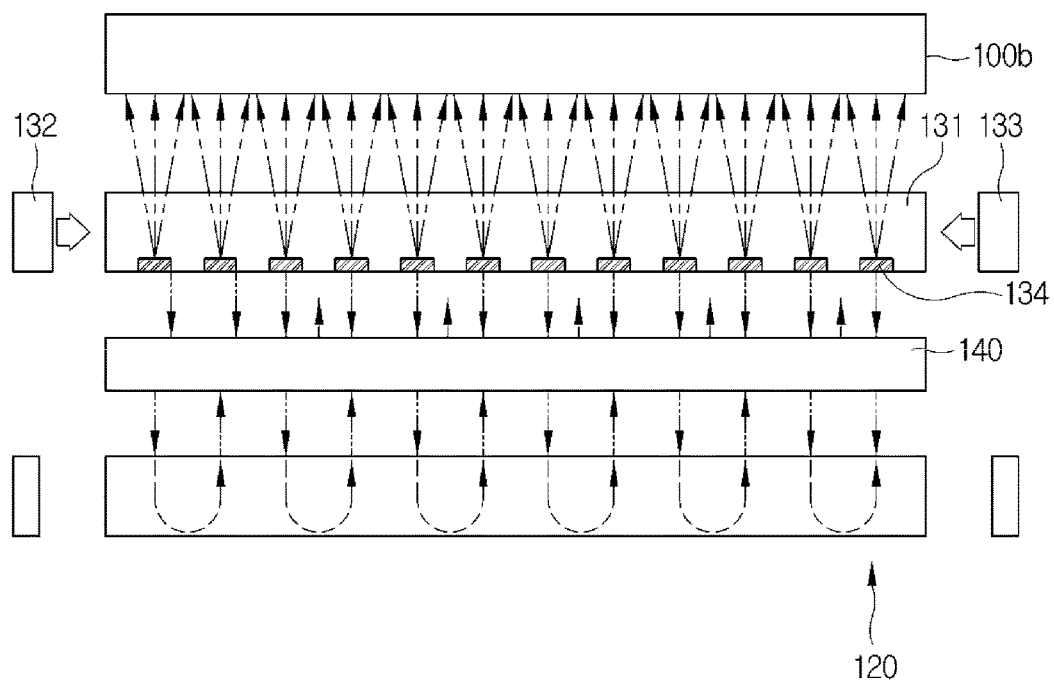
FIG. 17 shows a light path when a display apparatus having a direct type backlight unit as a first backlight unit operates in a 3D image display mode, according to an exemplary embodiment.

FIG. 17 shows a light path of the display apparatus 100 having the first backlight unit 120 that is a direct type backlight unit, when the display apparatus 100 operates in the 3D image display mode.

The display apparatus may operate the plurality of second light source units 132 and 133 installed in the second backlight unit 130 to emit light.

The light emitted from the plurality of second light source units 132 and 133 may be incident to the second light guide plate 131.

A part of the light incident to the second light guide plate 131 may be totally reflected in the inside of the second light guide plate 131, and a part of the light may be reflected by the barriers 134.

Also, the light reflected by the barriers 134 may be emitted to the outside.

Light emitted from the second light guide plate 131 of the second backlight unit 130 may be incident to the display panel 100*b*.

Then, the display panel 100*b* may display a 3D image using the incident light.

When the second backlight unit 130 is driven, a part of light totally reflected in the second light guide plate 131 of the second backlight unit 130 may leak toward the first backlight unit 120.

At this time, the light (that is, leakage light) leaking from the second light guide plate 131 may be incident to the polarizing panel 140.

The polarizing panel 140 may emit only light proceeding in a direction corresponding to its polarizing axis among the incident leakage light, toward the first backlight unit 120.

The leakage light incident to the first backlight unit 120 may be recycled in the inside of the first backlight unit 120 and then emitted to the outside.

The recycled light emitted from the first backlight unit 120 may be incident to the polarizing panel 140.

The polarizing panel 140 may emit only light proceeding in a direction corresponding to its polarizing axis among the incident recycled light, to the second backlight unit 130.

The light emitted from the polarizing panel 140 may be incident to the second backlight unit 130.

That is, when the second backlight unit 130 is driven, light leaking from the second backlight unit 130 may be primarily reduced by about 50% when passing through the polarizing panel 140, and light recycled in the first backlight unit 120 may be secondarily reduced by 50% additionally when again passing through the polarizing panel 140.

In this way, leakage light leaking from the second backlight unit 130 and then again incident to the second backlight unit 130 may be minimized, thereby minimizing light interfering with creating a 3D image when the 3D image is displayed.

Figure 18:
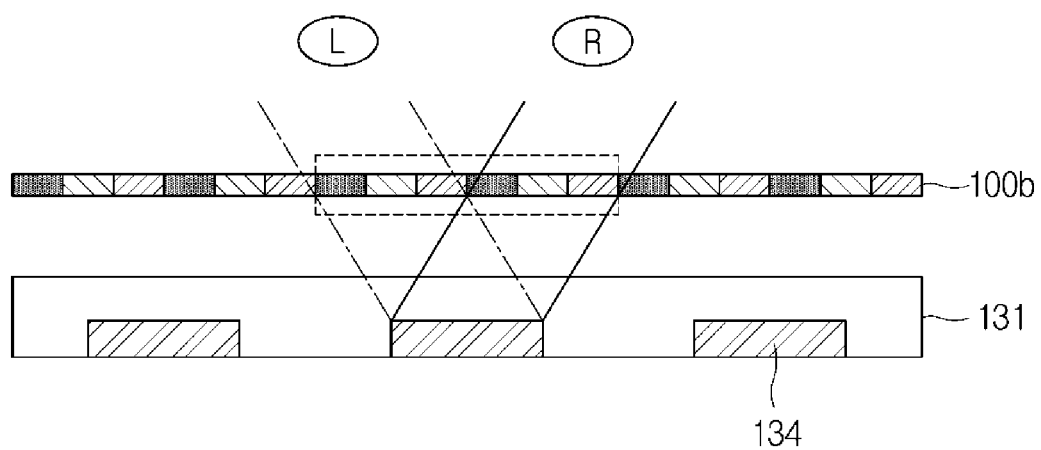
FIG. 18 illustrates a display apparatus displaying a 3D image using two viewpoint images, according to an exemplary embodiment.

FIG. 18 is a view illustrating an example in which the display apparatus 100 displays a 3D image by displaying two viewpoint images.

When a 2D image is displayed, a unit pixel of the display panel 100b may be allocated as one pixel for displaying one viewpoint image.

Pixels may be allocated to display a left eye image and a right eye image alternately in a horizontal direction. Accordingly, two unit pixels, each unit pixel for displaying a 2D image, may be combined in the horizontal direction to become a unit pixel (that is, a stereoscopic pixel) for displaying a 3D image.

Also, each barrier 134 may be positioned at the center of a stereoscopic pixel.

If light reflected by the barrier 134 is incident to the display panel 100b when two viewpoint images (that is, a left eye image L and a right eye image R) are allocated to each pixel of the display panel 100b, the left eye image L created by the incident light may arrive at a user's left eye, and the right eye image R created by the incident light may arrive at the user's right eye.

Figure 19:
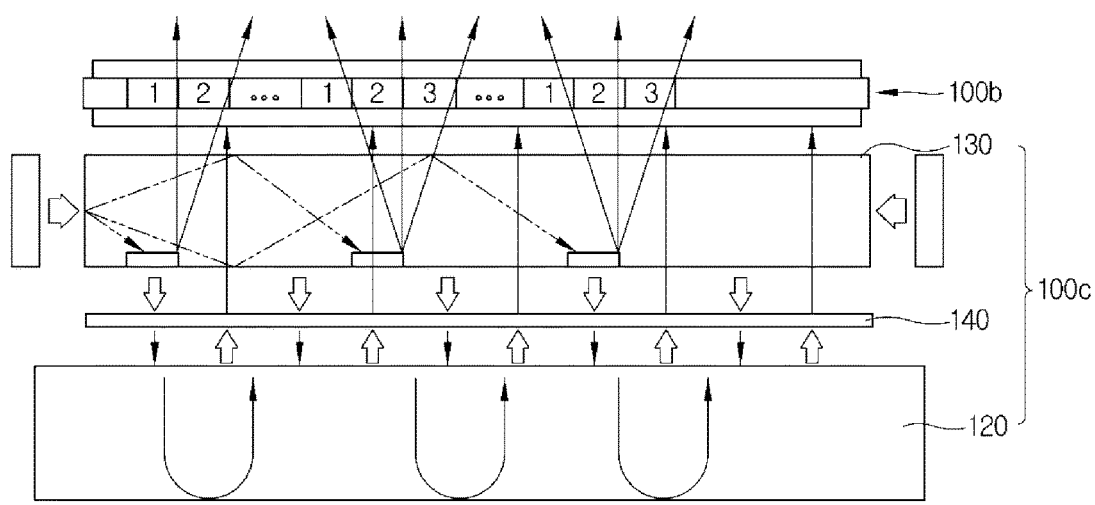
FIG. 19 illustrates a display apparatus displaying a 3D image having at least three viewpoints.

FIG. 19 is a view illustrating an example in which the display apparatus 100 displays a 3D image having at least three viewpoints.

For example, the display apparatus 100 may display a 3D image having four viewpoints.

The display panel 100b may include a plurality of pixels for implementing Red, Green, and Blue (RGB) colors. The plurality of pixels may be arranged in a matrix form extending in a first direction (that is, a vertical direction) and in a second direction (that is, a horizontal direction).

In this case, color pixels (RGB) successively arranged in the horizontal direction may display a 2D image.

If light reflected by a barrier 134 is incident to each pixel when four channels are allocated to each pixel of the display panel 100b, a first channel image, a second channel image, a third channel image, and a fourth channel image created by the light incident to the pixel may be displayed according to viewing angle directions.

Herein, the first channel image, the second channel image, the third channel image, and the fourth channel image may be successively displayed.

Accordingly, a user can view a 3D image at various locations having different viewing angles.

Figure 20A:
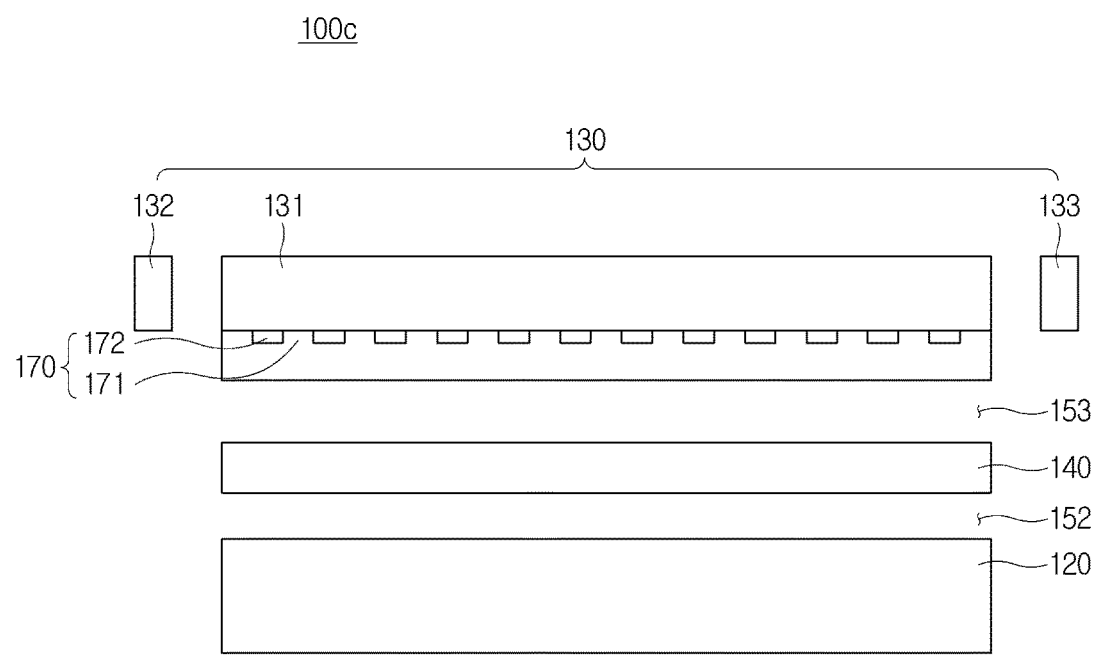
FIGS. 20A and 20B are configuration diagrams of a backlight assembly of a display apparatus according to an exemplary embodiment.
Figure 20B:
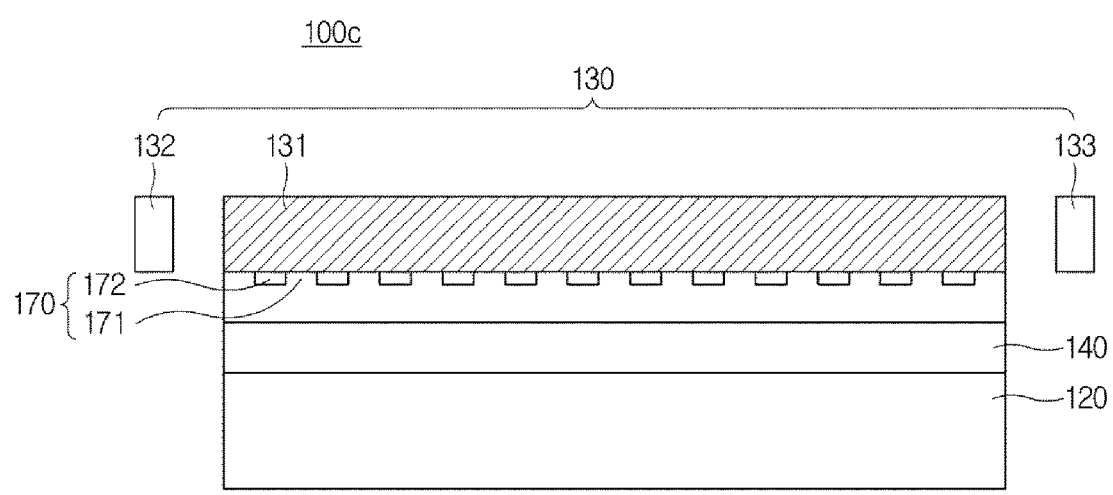

FIGS. 20A and 20B are configuration diagrams of the backlight assembly 100c installed in the display apparatus 100 according to another embodiment.

As shown in FIG. 20A, the backlight assembly 100c to emit light toward the display panel 100b (see FIG. 4) may include the first backlight unit 120 to display a 2D image, the second backlight unit 130 to display a 3D image, the polarizing panel 140 disposed between the first backlight unit 120 and the second backlight unit 130 and configured to reduce an amount of incident light when light leaking from the second backlight unit 130 is incident to the second backlight unit 130 via the first backlight unit 120 while the second backlight unit 130 operates, and a barrier panel 170 disposed between the second backlight unit 130 and the polarizing panel 140 in such a way to contact the second backlight unit 130 and having a transmission area 171 to transmit light and a reflective area 172 to reflect light from the second backlight unit 130.

The first backlight unit 120 may be an edge type backlight unit or a direct type backlight unit.

The second backlight unit 130 may include the second light guide plate 131, and the second light source units 132 and 133 disposed along both lateral sides of the second light guide plate 131.

A surface adjacent to the display panel 100b among a plurality of surfaces of the second light guide plate 131 may have been mirror-like finished throughout the entire surface. The mirror-like finished surface may totally reflect light incident at a predetermined angle or more to the inside of the second light guide plate 131 and emit light incident at an angle that is lower than the predetermined angle to the outside.

Herein, the light incident at the predetermined angle or more may be light having an incident angle satisfying a total reflection condition.

The polarizing panel 140 may be an absorptive polarizing panel to absorb polarized light orthogonal to the polarizing axis, or a reflective polarizing panel to reflect polarized light orthogonal to the polarizing axis.

The display apparatus 100 may include a first gap formed between the display panel 100b and the backlight assembly 100c.

The backlight assembly 100c may further include a second gap 152 formed between the first backlight unit 120 and the polarizing panel 140, and a third gap 153 formed between the second backlight unit 130 and the polarizing panel 140.

In the reflective area 172 of the barrier panel 170, a plurality of barriers may be arranged at regular intervals. The barriers may be parallax barriers that are opaque.

The barriers of the reflective area 172 may include a pattern formed on the surface of the barrier panel 170 by laser machining, sandblasting, or coating, or a pattern printed with an opaque material.

FIG. 20B is a configuration diagram of the display apparatus 100 according to another embodiment, and shows a modified example of the backlight assembly 100c of FIG. 20A.

As shown in FIG. 20B, the first backlight unit 120, the polarizing panel 140, the second backlight unit 130, and the barrier panel 170 of the backlight assembly 100c may contact each other.

Figure 21A:
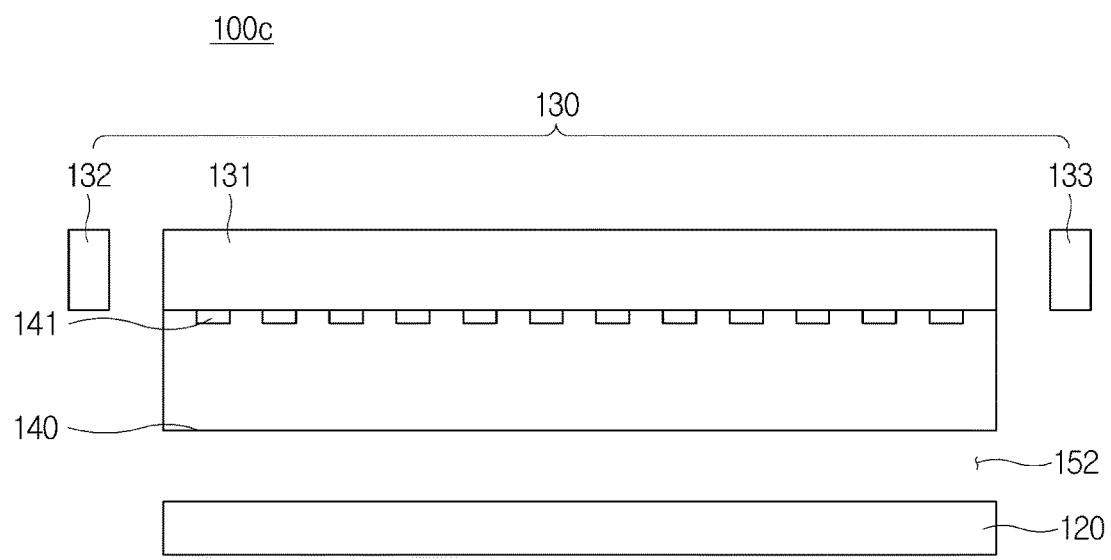
FIGS. 21A and 21B are configuration diagrams of a backlight assembly of a display apparatus according to another exemplary embodiment.
Figure 21B:
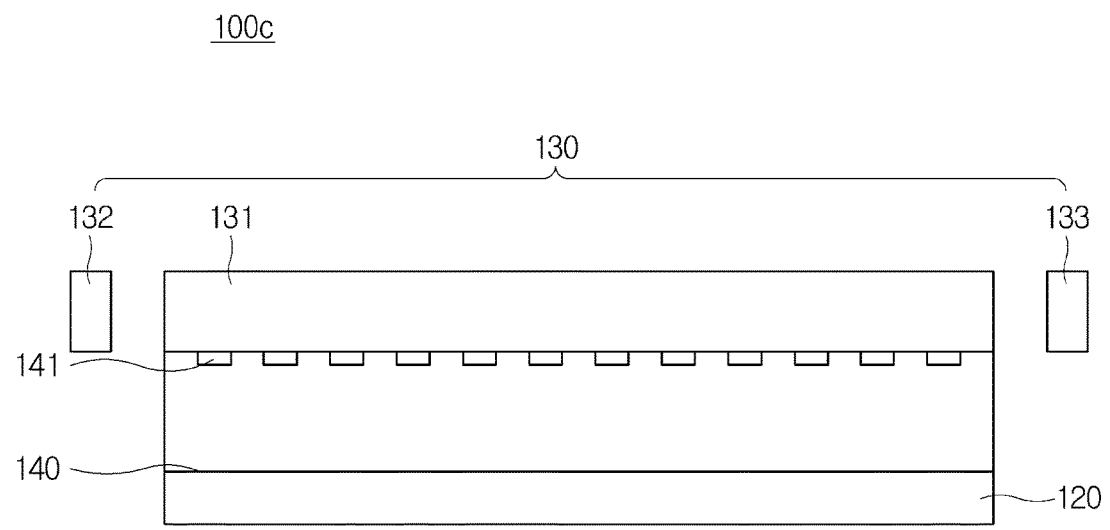

FIGS. 21A and 21B are configuration diagrams of the backlight assembly 100c included in the display apparatus 100 according to another embodiment.

As shown in FIG. 21A, the backlight assembly 100c to emit light toward the display panel 100b (see FIG. 4) may include the first backlight unit 120 to display a 2D image, the second backlight unit 130 to display a 3D image, and the polarizing panel 140 disposed between the first backlight unit 120 and the second backlight unit 130 in such a way to contact the second backlight unit 130 and configured to reduce an amount of incident light when light leaking from the second backlight unit 130 is again incident to the second backlight unit 130 via the first backlight unit 120 while the second backlight unit 130 operates.

The first backlight unit 120 may be an edge type backlight unit or a direct type backlight unit.

The second backlight unit 130 may include the second light guide plate 131, and the second light source units 132 and 133 disposed along both lateral sides of the second light guide plate 131.

A surface adjacent to the display panel 100b among a plurality of surfaces of the second light guide plate 131 may have been mirror-like finished throughout the entire surface. The mirror-like finished surface may totally reflect light incident at a predetermined angle or more to the inside of the second light guide plate 131 and emit light incident at an angle that is lower than the predetermined angle to the outside.

Herein, the light incident at the predetermined angle or more may be light having an incident angle satisfying a total reflection condition.

The polarizing panel 140 may be an absorptive polarizing panel to absorb polarized light orthogonal to the polarizing axis, or a reflective polarizing panel to reflect polarized light orthogonal to the polarizing axis.

The polarizing panel 140 may further include a plurality of barriers 141 arranged at regular intervals.

The barriers 141 may be parallax barriers that are opaque.

The barriers 141 may include a pattern formed on the surface of the polarizing panel 140 by laser machining, sandblasting, or coating, or a pattern printed with an opaque material.

The display apparatus 100 may include a first gap formed between the display panel 100b and the backlight assembly 100c.

The backlight assembly 100c may further include a second gap 152 formed between the first backlight unit 120 and the polarizing panel 140.

FIG. 21B is a configuration diagram of the display apparatus 100 according to another embodiment, and shows a modified example of the backlight assembly 100c of FIG. 21A.

As shown in FIG. 21B, the first backlight unit 120, the polarizing panel 140, and the second backlight unit 130 of the backlight assembly 100c may contact each other.

According to an aspect of the present disclosure, some of light leaking from the rear surface of a 3D backlight unit for emitting light for creating 3D images is prevented from being incident back to the 3D backlight unit, thereby reducing 3D cross-talk.

As a result, it is possible to improve the picture quality of 3D images in a 3D image display mode.

Also, the image display quality of the display apparatus can be improved.

Although some exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display apparatus comprising:
    a backlight assembly configured to emit light; and
    a display panel configured to display a two-dimensional (2D) image or a three-dimensional (3D) image using the light,
    wherein the display panel comprises:
        a liquid crystal panel;
        a first polarizing panel disposed between a first surface of the liquid crystal panel and the backlight assembly; and
        a second polarizing panel disposed on a second surface of the liquid crystal panel,
    wherein the backlight assembly comprises:
        a first backlight unit configured to emit light for creating the 2D image;
        a second backlight unit configured to emit light for creating the 3D image; and
        a third polarizing panel disposed between the first backlight unit and the second backlight unit, and configured to prevent at least a portion of leakage light leaking from the second backlight unit from being incident to the second backlight unit,
    wherein the second backlight unit comprises:
        a second light guide plate; and
        a second light source unit disposed along a lateral side of the second light guide plate, and configured to emit light to the second light guide plate,
    wherein the third polarizing panel comprises a plurality of barriers arranged at regular intervals on a surface of the third polarizing panel, the plurality of barriers being configured to reflect and scatter incident light regardless of a polarizing axis orientation of the incident light,
    wherein the light reflected by the plurality of barriers includes the light to create the 3D image, and is emitted to the second backlight unit, and
    wherein a polarizing axis of the first polarizing panel is orthogonal to a polarizing axis of the second polarizing panel, and is identical to a polarizing axis of the third polarizing panel of the backlight assembly.

2. The display apparatus according to claim 1, wherein the third polarizing panel is configured to emit only a portion of the leakage light that is incident to the third polarizing panel, and emit only a portion recycled light that is emitted from the first backlight unit and is incident to the third polarizing panel, the recycled light being emitted from the first backlight unit by recycling the portion of the leakage light that is emitted by the third polarizing panel and incident to the first backlight unit.

3. The display apparatus according to claim 1, wherein the first backlight unit comprises a first light guide plate, and a first light source unit disposed along a lateral side of the first light guide plate.

4. The display apparatus according to claim 1, wherein the first backlight unit comprises a first light source unit, and a diffusion plate disposed in front of the first light source unit, and configured to diffuse light emitted from the first light source unit.

5. The display apparatus according to claim 1, wherein the second light guide plate is configured to totally reflects light emitted from the second light source unit, and emit light scattered and reflected by the barriers to outside of the second light guide plate.

6. The display apparatus according to claim 1, wherein the second backlight unit and the third polarizing panel are configured to transmit light emitted from the first backlight unit.

7. The display apparatus according to claim 1, wherein the third polarizing panel is an absorptive polarizing panel.

8. The display apparatus according to claim 1, wherein the third polarizing panel is a reflective polarizing panel.

9. A display apparatus comprising:
    a display panel comprising a liquid crystal panel configured to create a left eye image and a right eye image using light reflected by a plurality of barriers in a 3D image display mode, a first polarizing panel disposed on a first surface of the liquid crystal panel, and a second polarizing panel disposed on a second surface of the liquid crystal panel;
    a first backlight unit configured to emit light;
    a second backlight unit disposed between the display panel and the first backlight unit, and configured to emit light;
    a third polarizing panel disposed between the first backlight unit and the second backlight unit; and
    a barrier panel disposed between the second backlight unit and the first polarizing panel, and having a transmission area to transmit light and a reflective area to reflect light,
    wherein the barrier panel includes the plurality of barriers arranged at regular intervals in the reflective area,
    wherein the second backlight unit comprises a light source and a light guide plate, wherein the plurality of barriers are configured to reflect and scatter incident light regardless of a polarizing axis orientation of the incident light, wherein the transmission area of the barrier panel contacts the light guide plate, and wherein a polarizing axis of the first polarizing panel is orthogonal to a polarizing axis of the second polarizing panel, and is identical to a polarizing axis of the third polarizing panel.

10. The display apparatus according to claim 9, wherein the third polarizing panel is configured to:

reduce an amount of leakage light that leaks from the second backlight unit and is incident to the third polarizing panel and emit the reduced amount of the leakage light to the first backlight unit, and reduce an amount of recycled light that is emitted from the first backlight unit and is incident to the first backlight unit, and emit the reduced amount of the recycled light to the second backlight unit, the recycled light being emitted from the first backlight unit by recycling the reduced amount of the leakage light that is emitted by the third polarizing panel and incident to the first backlight unit.

11. The display apparatus according to claim 9, wherein the third polarizing panel contacts the barrier panel.

12. The display apparatus according to claim 9, wherein the first backlight unit contacts the third polarizing panel.

13. The display apparatus according to claim 9, further comprising a controller configured to control driving of the first backlight unit in a two-dimensional (2D) image display mode, control driving of the second backlight unit in a three-dimensional (3D) image display mode, and control driving of the display panel based on image information.

* * * * *